Figure 4:
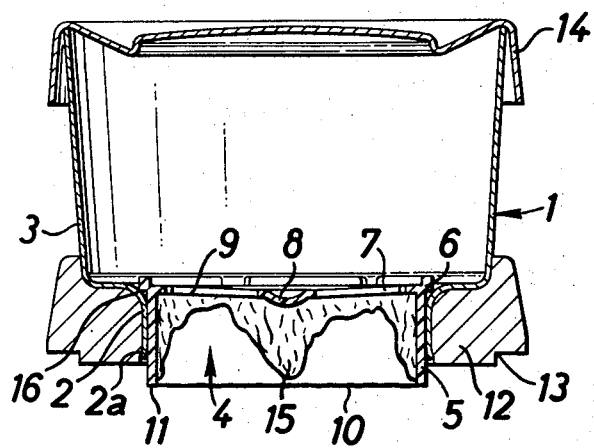

United States Patent [19]

Telco

[11] 3,811,373
[45] May 21, 1974

[54] BEVERAGE MAKING DEVICE
[75] Inventor: Paul Telco, Hatfield, Hertfordshire, England
[73] Assignee: Telco (Group Management) Limited, Hertfordshire, England
[22] Filed: Oct. 22, 1971
[21] Appl. No.: 191,876

[30] Foreign Application Priority Data
Oct. 28, 1970 Great Britain.................... 51219/70
Dec. 21, 1970 Great Britain.................... 60572/70

[52] U.S. Cl...................... 99/295, 99/306, 426/77, 426/82
[51] Int. Cl. .......................... A23f 1/00, B65b 29/02
[58] Field of Search ........ 99/77.1, 66, 171 B, 171 P, 99/295, 306; 206/.5; 426/77, 82

[56] References Cited
UNITED STATES PATENTS
3,083,101 3/1963 Noury.................................. 99/77.1
3,389,650 6/1968 Michielsen........................... 99/295
2,716,937 9/1955 Milano.............................. 99/295 X
3,589,272 6/1971 Bouladon........................ 99/77.1 X
1,108,288 8/1914 Watson........................ 99/77.1 UX
2,885,290 5/1959 Krasker................................ 99/77.1
1,456,010 5/1923 Richheimer................... 99/77.1 UX
2,309,526 1/1943 Moore et al. .................... 99/306 X FOREIGN PATENTS OR APPLICATIONS
1,289,610 2/1961 France................................ 99/295
1,347,892 11/1962 France................................ 99/306
598,677 10/1959 Italy...................................... 99/295
627,766 11/1961 Italy...................................... 99/306
1,080,222 6/1953 France.............................. 99/77.1

Primary Examiner—Tim R. Miles
Assistant Examiner—Steven L. Weinstein
Attorney, Agent, or Firm—Christensen, O'Connor, Garrison & Havelka

[57] ABSTRACT

A beverage producing device comprising a receptacle for liquid and an envelope containing a predetermined quantity of finely divided beverage producing material e.g., coffee grounds sufficient for a single cup of coffee, the envelope being arranged in press fit sealing engagement with an envelope supporting portion of the receptacle and having a wick to assist in conveying liquid through the envelope. A dished lid serves as a tray for the receptacle after use.

12 Claims, 4 Drawing Figures

PATENTED MAY 21 1974
3,811,373
SHEET 1 OF 2
Fig. 1
Fig. 2
Fig. 3
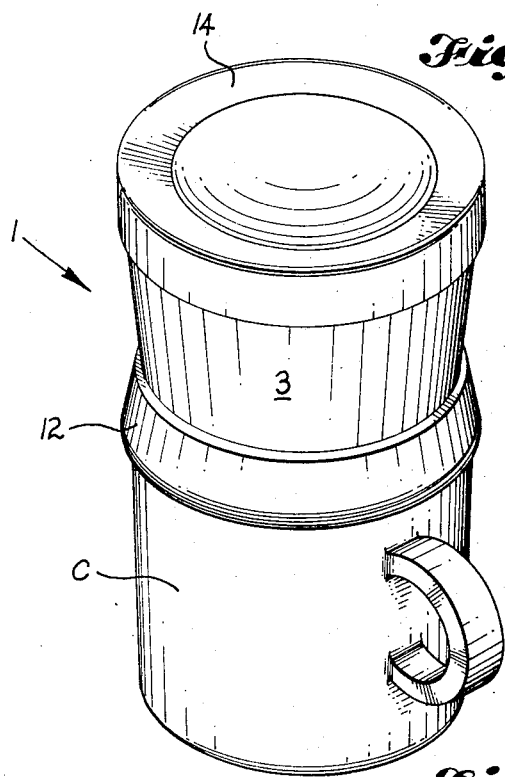
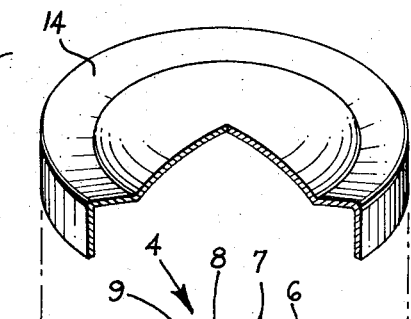
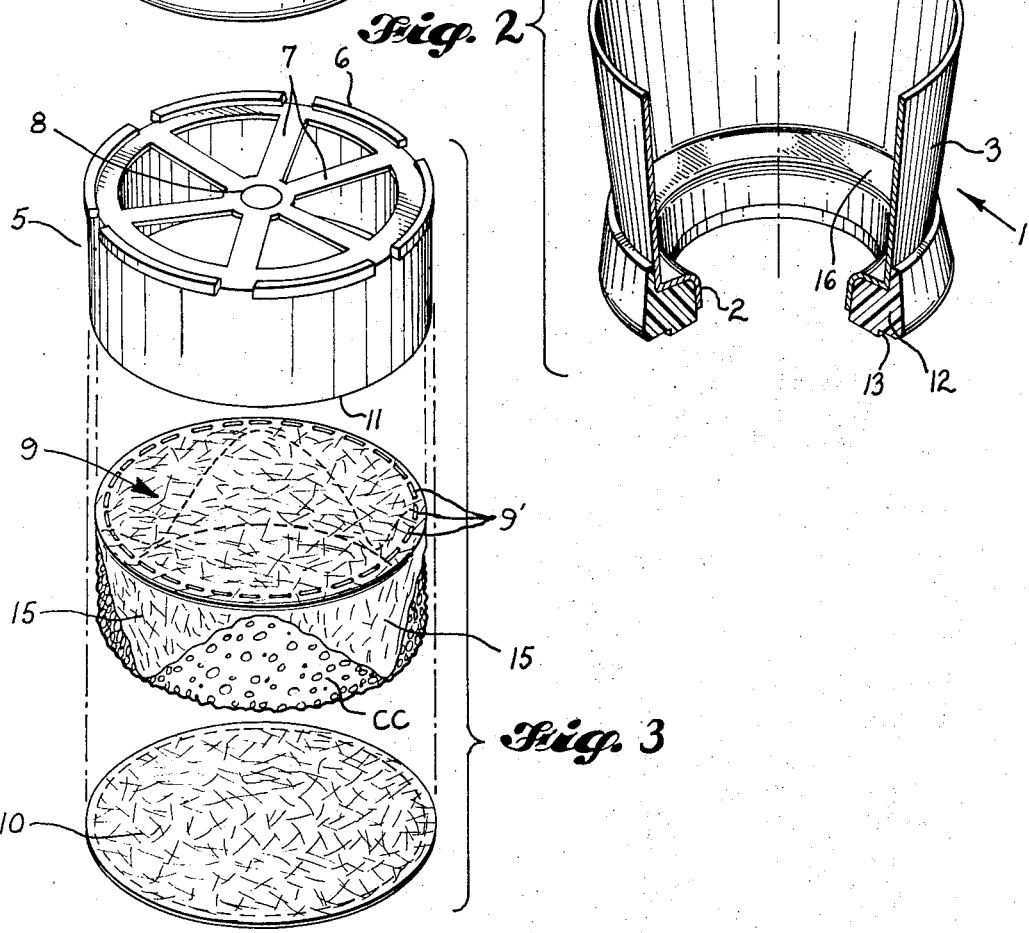
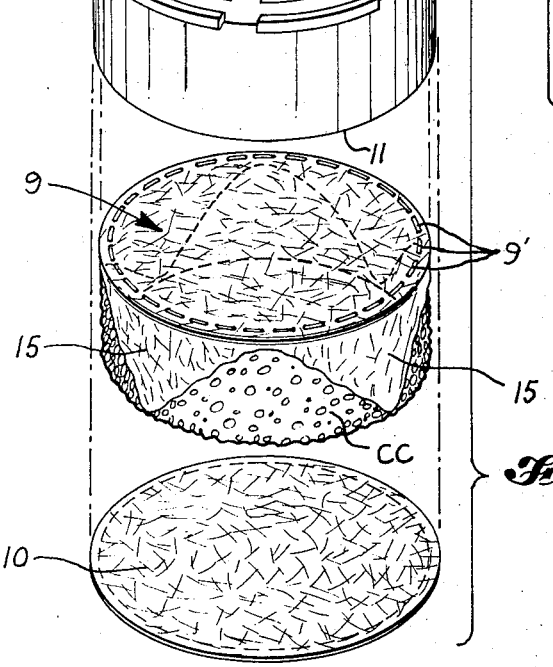

BEVERAGE MAKING DEVICE

This invention relates to beverage making devices of the kind in which a predetermined amount of beverage producing substance in finely divided form is sealed within an envelope arranged to be located within a liquid receptacle for production of a single cup of coffee or other beverage.

An object of the present invention is to provide an improved disposable filter unit for such beverage-making devices.

A further object of the invention is to provide an improved receptacle for such beverage making devices.

According to one aspect of the present invention there is provided a beverage-making device comprising a liquid receptacle and having a portion formed integrally with the main body of the receptacle for the receipt of an envelope containing a predetermined amount of a beverage producing substance in finely divided form and arranged to be located in press fit sealing engagement with said portion of the receptacle.

According to a further aspect of the present invention there is provided a beverage-making device comprising a liquid receptacle having an envelope supporting portion formed integrally with the main body of the receptacle and an envelope containing a predetermined amount of a beverage-producing substance located in press tight sealing engagement with said portion of the receptacle.

According to a further aspect of the invention there is provided a filter unit for the beverage making device described above wherein the envelope is provided with a wick to assist in the conveying of the beverage through the envelope.

According to a further feature of the invention, the envelope is formed from a material capable of shrinkage on cooling, thereby facilitating removal of the envelope from the envelope supporting portion of the receptacle.

In a preferred embodiment of the invention there is provided a beverage-making device of the kind described wherein the dimensions of the envelope are such that it is a press fit in the envelope supporting portion of the receptacle and is held in physical sealing engagement therewith in response to the application thereto of manual pressure only.

The invention will now be described by way of example only with particular reference to the accompanying drawings wherein FIG. 1 is a perspective view of a beverage-making device mounted on a cup; FIG. 2 is an exploded perspective view of the device; FIG. 3 is a similar view of the envelope therein; and FIG. 4 is a sectional side elevation of the device.

The receptacle 1 is of non-tarnishable metal or metal alloy and includes an envelop-supporting portion 2 formed integrally with the main portion 3 of the receptacle. The portion 2 is of reduced diameter from that of the main portion 3 to accommodate an envelope or filter unit 4 arranged to contain a predetermined quantity of particulate beverage material such as coffee grounds, sufficient to make a single cup of coffee.

The envelope 4 comprises a cylindrical cartridge having a wall 5 formed with a rim, or collar 6 and a plurality of radial spokes radiating from a central portion 8 to the rim 6, a square filter paper 9 being welded to the rim by an intermittent weld 9' and a further filter paper 10 being welded to the opposite rim 11 of the envelope 4.

A ring 12 of thermosetting plastics material is secured to the outer surface of the receptacle 1 and formed with an annular shoulder 13 to permit the receptacle to be placed in position on the rim of a coffee cup C or like beverage container; the lower end of the envelope supporting portion 2 being swaged over as shown at 2a to engage in a groove in the base of the ring 12. See FIG. 4.

The receptacle 1 is provided with a lid 14 of dished configuration serving as a tray for the receptacle after use.

As shown in the drawings the collar 6 is located in sealing engagement with the envelope supporting portion 2 when the filter unit is manually pressed into the portion 2, and the envelope 4 projects below the level of the ring 12.

The top filter paper 9 is square and when welded to the rim 6 of the envelope has depending portions 15 serving as wicks and providing a bridge between the body of the coffee charge CC within the envelope and the external surface of the filter paper 9. The bottom filter paper 10 is of circular configuration.

In operation, the envelope 4 containing the particulate beverage material is pressed manually into the envelope supporting portion 2 until the collar 6 is in abutting relationship with the radiused base 16 of the receptacle 1. Boiling water is poured into the receptacle and the action is such that the water slowly percolates through the particulate material and the beverage drops into the cup or container located beneath the ring 12.

The cylindrical wall 5 of the envelope 4 is formed of plastics material capable of shrinking when subjected to cooling. This allows the envelope to fall from the receptacle when the latter is turned upside down thereby facilitating cleansing of the receptacle.

It has been found that the depending wick portions 15 prevent the cartridge or envelope from becoming blocked particularly when the particulate material such as coffee grounds is fine ground, oily or very fresh, by providing a wick action between the particulate material and the external surface of the filter paper. However, it is not necessary for the wick to be formed in the manner shown in the drawing and described hereinbefore. For instance, the wick portion may be formed by introducing a curved piece of filter paper into the envelope and sealing the ends of the curved wick to the bottom or top rim of the envelope. The wick may comprise a piece of filter paper forming the upper or lower filter member and sealed to the cylindrical wall of the envelope intermediate the upper and lower rims thereof. In a further wick arrangement, both upper and lower filter papers may extend into the centre of the envelope and be sealed to points intermediate the upper and lower rims of the cylindrical wall of the envelope. One of the filter papers in another construction of wick may have a reentrant portion extending into the envelope and spaced from the other filter paper. In other words, any configuration of wick may be chosen which has the effect of forming a bridge between the main charge of particulate material within the envelope and the external surface of the filter paper.

It has been found that in operation when the bulk of the boiling water has traversed the particulate material in the cartridge or envelope, a small amount of water may be trapped between the reduced portions 15 of the receptacle or vat and the envelope.

The collar 6 is slotted and because of the particular material used for the cylindrical wall of the envelope, the cartridge cools and shrinks and the last traces of water are allowed to pass down the side of the envelope through the slots into the container beneath the receptacle.

Although the receptacle 1 has been described as having an envelope supporting portion 2 of reduced diameter, such as to provide a press tight fit for the reception of the envelope, it will be appreciated that the envelope supporting portion may be of convergent configuration to accommodate a tapered envelope containing the beverage producing material. Furthermore, although the latter has been referred to as of finely divided or particulate form it will be appreciated that the envelope may contain tea leaves, coffee grounds or other beverage producing material.

What we claim is:

1. In combination, an apertured support which is adapted to rest on the rim of a cup-shaped liquid container and has a beverage producing cartridge removably seated in the aperture thereof, said cartridge having a vertically oriented, tube-like passage therethrough, the surrounding wall of which passage is liquid-impermeable and sufficiently rigid to be form-sustaining in use, and two sheets of filter paper secured to the cartridge and extending in continuous uninterrupted condition across the passage, substantially coincident with cross-sectional planes thereof, so as to close the passage at the sites of the respective sheets, yet disposed in spaced relationship to one another axially of the passage, so as to be separated by a portion of the wall, the lower of said sheets having a charge of a liquid leachable beverage-producing substance disposed thereon, in the space between the sheets, and the upper of said sheets having a portion thereof which is deflected relatively away from the corresponding cross-sectional plane of the passage, so as to depend into the space from the main body of said upper sheet, independently of the lower sheet and within the confines of the wall portion, and which is disposed in contact with the charge so as to form a capillary bridge between the external surface of the upper sheet and the charge when liquid is applied to said surface.

2. The combination according to claim 1 wherein the cartridge is press-fitted into the aperture of the support, and the cartridge and support have different rates of thermal expansion and contraction, so that when heated, the cartridge will shrink with respect to the support on cooling, for ease of removing the cartridge from the same.

3. The combination according to claim 1 further comprising a dished lid inverted on the support and adapted to serve as a tray for the cartridge when the cartridge and the lid are removed from the support and placed upright apart therefrom.

4. The combination according to claim 1 wherein the support has an annular shoulder about the aperture therein, and the cartridge has an annular flange thereon which is seated on the shoulder.

5. The combination according to claim 4 wherein the cartridge depends below the bottom of the aperture in the support.

6. In combination, a cartridge having a vertically oriented, tubelike passage therethrough, the surrounding wall of which passage is liquid-impermeable and sufficiently rigid to be form-sustaining in use, and two sheets of filter paper secured to the cartridge and extending in continuous uninterrupted condition across the passage, substantially coincident with cross-sectional planes thereof, so as to close the passage at the sites of the respective sheets, yet disposed in spaced relationship to one another axially of the passage, so as to be separated by a portion of the wall, the lower of said sheets having a charge of a liquid leachable beverage producing substance disposed thereon, in the space between the sheets, and the upper of said sheets having a portion thereof which is deflected relatively away from the corresponding cross-sectional plane of the passage, so as to depend into the space from the main body of said upper sheet, independently of the lower sheet and within the confines of the wall portion, and which is disposed in contact with the charge so as to form a capillary bridge between the external surface of the upper sheet and the charge when liquid is applied to said surface.

7. The combination according to claim 6 wherein the beverage producing substance includes coffee granules.

8. The combination according to claim 6 wherein the upper sheet has a plurality of relatively deflected portions thereof depending into the space, in angularly spaced relationship to one another about the axis of the passage.

9. The combination according to claim 6 wherein the cartridge is substantially rigid.

10. The combination according to claim 6 wherein the passage is cylindrical and the upper sheet is normally square in outline but secured to the cartridge crosswise of the passage, with the corners thereof deflected away from the main body of the sheet, so that the corners depend into the space from the main body to form a plurality of capillary bridges which are angularly spaced about the axis of the passage.

11. The combination according to claim 10 wherein the passage has a multiapertured frame thereacross, and the main body of the upper sheet is secured to the frame across the apertures therein.

12. The combination according to claim 11 wherein the frame has concentric center and rim portions interconnected by a plurality of spaced oriented spokes therebetween.

* * * * *

UNITED STATES PATENT OFFICE
CERTIFICATE OF CORRECTION

Patent No. 3,811,373            Dated May 21, 1974

Inventor(s) Paul Telco

It is certified that error appears in the above-identified patent and that said Letters Patent are hereby corrected as shown below:

Claim 12, line 3, before "oriented" insert --radially--.

Signed and sealed this 17th day of September 1974.

(SEAL)
Attest:

McCOY M. GIBSON JR.
Attesting Officer

C. MARSHALL DANN
Commissioner of Patents